United States Patent
Nassar et al.

(10) Patent No.: US 10,382,257 B2
(45) Date of Patent: Aug. 13, 2019

(54) MICROSERVICES COMMUNICATION PATTERN FOR FAULT DETECTION IN END-TO-END FLOWS

(71) Applicant: INTERNATIONAL BUSINESS MACHINES CORPORATION, Armonk, NY (US)

(72) Inventors: Nader M. Nassar, Yorktown Heights, NY (US); Tamer M. Nassar, Brookfield, CT (US); Hesham E. Soultan, Giza (EG); Alaa S. Youssef, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 15/460,308

(22) Filed: Mar. 16, 2017

(65) Prior Publication Data

US 2018/0270107 A1 Sep. 20, 2018

(51) Int. Cl.
*H04L 12/24* (2006.01)

(52) U.S. Cl.
CPC ...... *H04L 41/0686* (2013.01); *H04L 41/0677* (2013.01)

(58) Field of Classification Search
CPC . H04L 41/0686; H04L 41/0677; H04L 12/26; H04L 29/08; H04L 1/18; H04L 1/1809; H04L 67/025; H04L 67/10; H04L 43/50; H04L 67/1002; H04L 67/28; H04L 67/1031; H04L 1/1614; H04L 1/664; H04L 41/5038; H04L 41/0654; H04L 67/16; H04L 67/2814; G06F 11/20; G06F 11/16;

(Continued)

(56) References Cited

U.S. PATENT DOCUMENTS

2017/0242784 A1 * 8/2017 Heorhiadi ........... H04L 41/5038
2018/0152534 A1 * 5/2018 Kristiansson ........... H04L 67/16

(Continued)

FOREIGN PATENT DOCUMENTS

EP 2254310 B1 8/2014

OTHER PUBLICATIONS

Anonymous, "Failure Localization in a Distributed/Microservice Environment," An IP.com Prior Art Database Technical Disclosure, IP.com No. IPCOM000248317D, Nov. 15, 2016 (5 pages).

(Continued)

*Primary Examiner* — Hardikkumar D Patel
(74) *Attorney, Agent, or Firm* — Griffiths & Seaton PLLC

(57) ABSTRACT

Embodiments for fault detection in an end-to-end communication flow between microservices within a cloud computing environment by one or more processors. A communication pattern may be established between an invoking microservice and one or more microservices to enable fault detection of a failure of an end-to-end communication flow between the invoking microservice and the one or more microservices, wherein the communication pattern includes a request to self-monitor for the fault detection by the one or more microservices, and an acknowledgement response provided by the invoking microservice to the one or more microservices indicating success or failure of the end-to-end communication flow between the invoking microservice and the one or more microservices.

18 Claims, 8 Drawing Sheets

(58) Field of Classification Search
CPC . G06F 11/07; G06F 11/36; G06F 8/60; G06F 11/14; G06F 11/0709; G06F 11/0751; G06F 11/079; G06F 11/3006; G06F 9/5077; G06F 17/30; G06F 17/3033; G06F 11/1629; G06F 11/2038; G06F 11/3636; G06F 11/3688; G06F 11/3684; G06F 11/3692; G06F 8/20; G06Q 10/083; G06Q 10/08; H04W 4/80
See application file for complete search history.

(56) References Cited

U.S. PATENT DOCUMENTS

2018/0225182 A1\* 8/2018 Chen .................... G06F 11/2038
2018/0234523 A1\* 8/2018 Jose ........................ H04L 67/42

OTHER PUBLICATIONS

Heorhiadi et al., "Gremlin: Systematic Resilience Testing of Microservices," IEEE 36th International Conference on Distributed Computing Systems (ICDCS), 2016 (10 pages).

\* cited by examiner

MICROSERVICES COMMUNICATION PATTERN FOR FAULT DETECTION IN END-TO-END FLOWS

BACKGROUND OF THE INVENTION

Field of the Invention

The present invention relates generally to large scale computing, and more particularly to microservices communication pattern for fault detection in end-to-end flows in a computing environment.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost-effective way to deliver information technology services. A fundamental need exists to enhance the underlying systems and infrastructure which support and maintain this fast-growing industry. It should be noted that microservices may be a specialization of an implementation approach for service-oriented architectures (SOA) used to build flexible, independently deployable software systems. Services in a microservice architecture (MSA) may be processes that communicate with each other over a network in order to fulfill a goal.

SUMMARY OF THE INVENTION

Various embodiments are provided for fault detection in an end-to-end communication flow between microservices within a cloud computing environment by one or more processors. A communication pattern may be established between an invoking microservice and one or more microservices to enable fault detection of a failure of an end-to-end communication flow between the invoking microservice and the one or more microservices, wherein the communication pattern includes a request to self-monitor for the fault detection by the one or more microservices, and an acknowledgement response provided by the invoking microservice to the one or more microservices indicating success or failure of the end-to-end communication flow between the invoking microservice and the one or more microservices.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
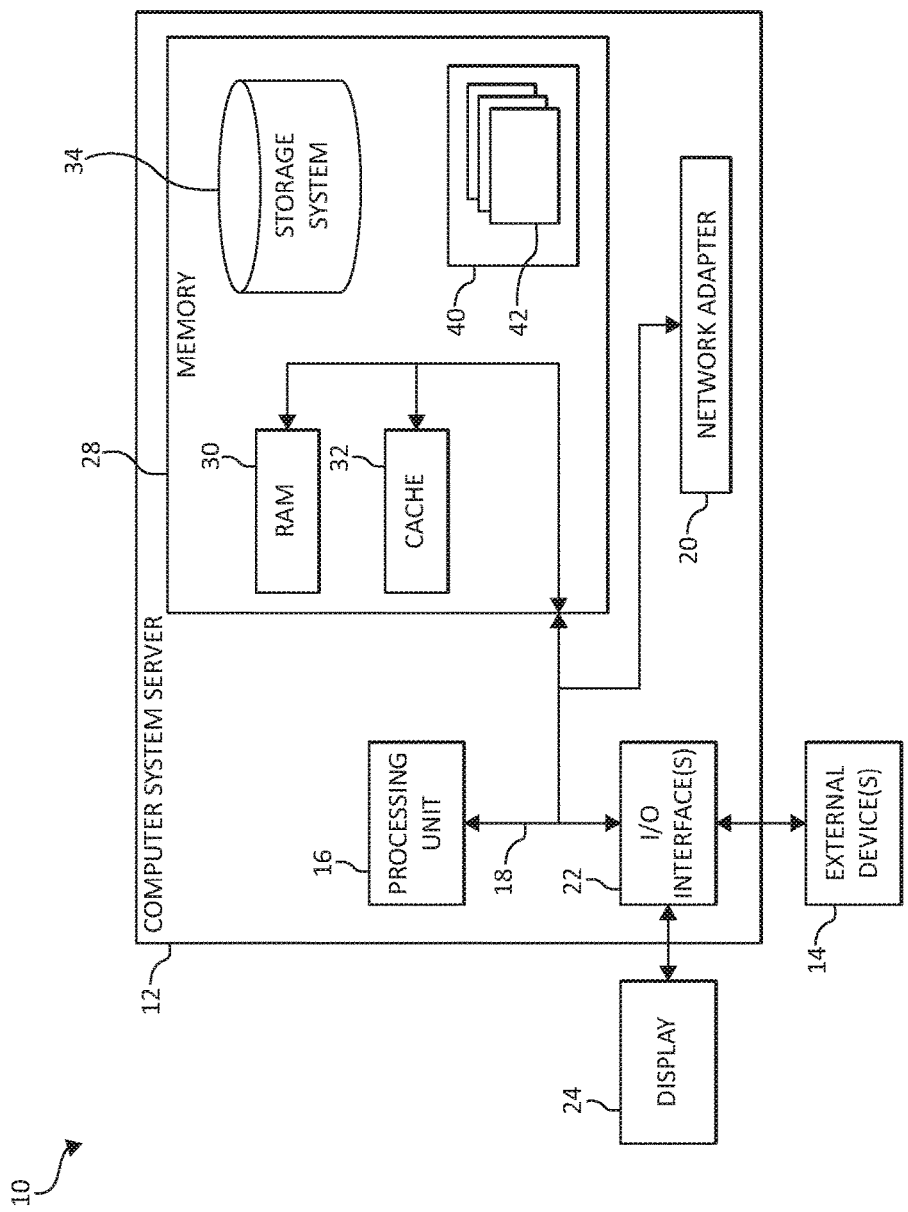
FIG. 1 is a block diagram depicting an exemplary cloud computing node according to an embodiment of the present invention.

The emergence of cloud computing changes the paradigm of how people utilize computing resources by providing, for example, a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

Within the cloud computing environment, microservices may be provided. Microservices may be one or more processes that communicate with each other over a network in order to achieve or fulfill an objective or goal. For example, microservices may be distributed services that perform different responsibilities or different smaller services in a system in order to enhance cohesion in the cloud computing environment. Microservices may be an architectural design to create cloud applications, where each application is built as a set of services. Each service runs in its own processes and communicates through application programming interfaces (API). Services may be built around specific logic, written in any language and may be independently scalable, upgradeable and deployable. When an application is broken up into its component services, changes only affect specific services. Likewise, each service can independently scale in response to demand without consuming unnecessary resources. Simply stated, microservices may be applications/components communicating with one another so as to provide a service. A microservice may be a combination of microservice components selected to facilitate the microservice. In one aspect, in a microservices architecture, services should have a small granularity and the protocols should be lightweight. A microservices property that appears in multiple definitions is that services should be independently deployable. The benefit of distributing different responsibilities of the system into different smaller services is that it enhances the cohesion and decreases the coupling.

In view of the forgoing, the present invention provides for fault detection in an end-to-end communication flow between microservices within a cloud computing environment by one or more processors. The microservices may be deployed in the cloud computing environment. A communication pattern, such as a 3-way communication pattern, may be provided between microservices and/or between a client application and microservices, which enables the early detection of an end-to-end application/communication flow failure without the need for special monitoring agents. The application end-to-end application/communication flows may be composed of multiple steps, actions, and/or services each implemented by a microservice. The communication pattern may be synchronous or asynchronous and may be used between different microservices.

In an additional aspect, the present invention provides a 3-way communication pattern between microservices (and/or client applications), including 1) a request sent from an invoking microservice (which may also be a client application), 2) a response sent back to the invoking microservice from a microservice indicating or "invoking" self-monitoring end-to-end application/communication flow failure at the microservice, and 3) a $3^{rd}$ acknowledgement message sent from the invoking microservice to each microservice that sent the response sent back to the invoking microservice from a microservice indicating or "invoking" self-monitoring end-to-end application/communication flow failure at the microservice. The $3^{rd}$ acknowledgement message, or lack of which within some reasonable time limit, enables early detection of an end-to-end application flow failure by one or more of the microservices participating in the end-to-end application/communication flow. A unique application flow identifier may be communicated as header over one or more of the end-to-end application/communication flow messages. For example, the unique application flow identifier may be included in the header of the request sent by the invoking microservice. A side-car implementation may be provided whereby an application developer does not implement the additional protocol steps to insert a unique identifier in a message header, nor to send back to the invoker self-monitoring indicator message or self-monitoring indicator header injected in the response message. In a microservices architecture where side-cars are used, a side-car is associated with each microservice in the system and carries out common protocol steps on behalf of the microservice it is attached to. The side-car implementation may take the form of a component within the microservice, a separate process started by the microservice, or a separate container associated with the main microservice container containing the application logic.

In this way, the microservices communication pattern for fault detection in end-to-end flows between microservices within a cloud computing environment increases computing efficiency while enabling the microservices to be more robust by enabling self-monitoring at the transaction level of the end-to-end application/communication flow messages. For example, the present invention provides for monitoring services at the transaction level of each microservice. Using the microservices for the monitoring services enables determining if an application is up or down (e.g., operational or not operational), if a response time is too high, and may ensure whether an end-to-end transaction is completed successfully or not. The microservice transaction level monitoring may establish a communication plane between a client application and used microservices, in order to achieve the desired transaction monitoring capability without introducing an additional monitoring service overhead in order to provide early detection of an end-to-end transaction failure.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
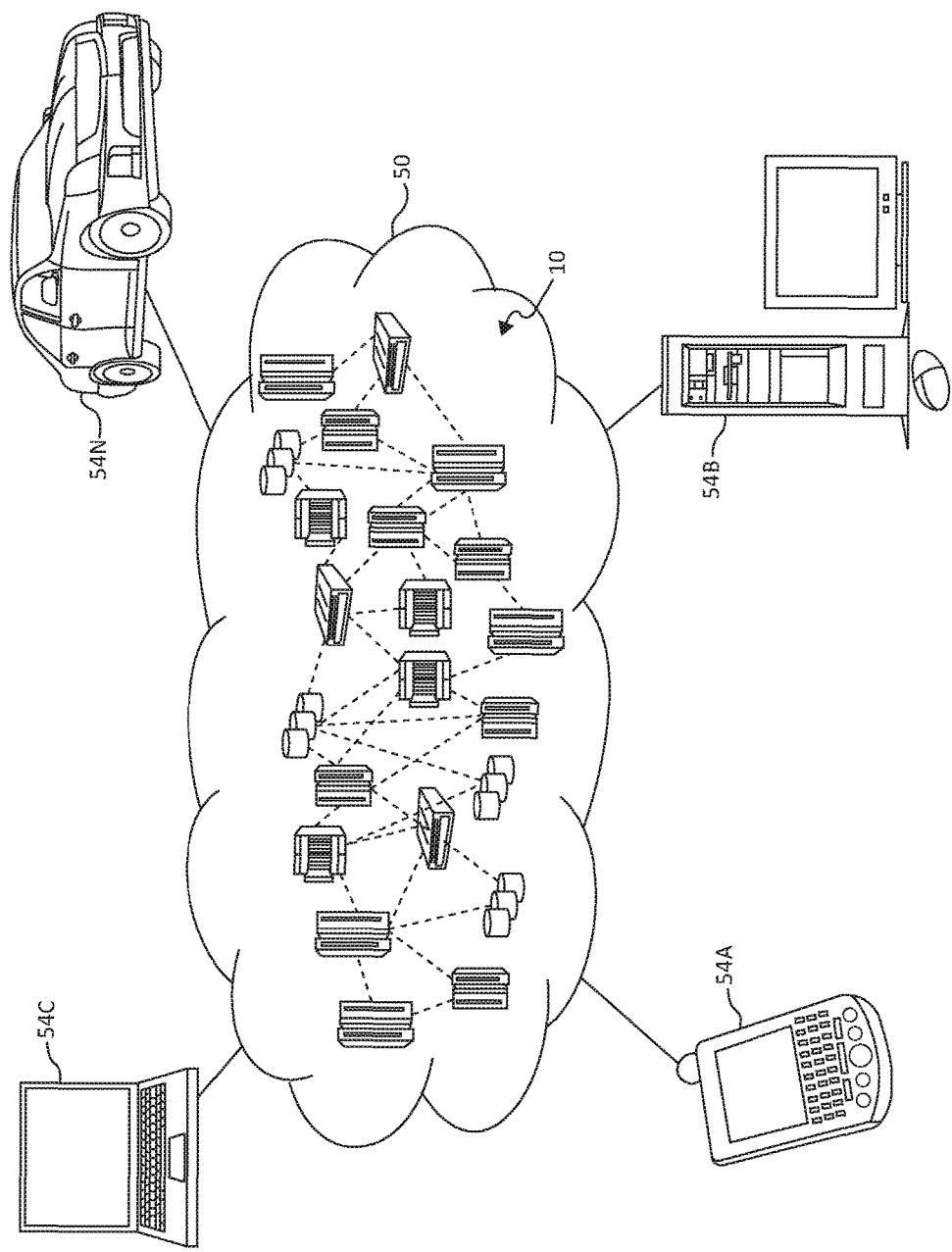
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
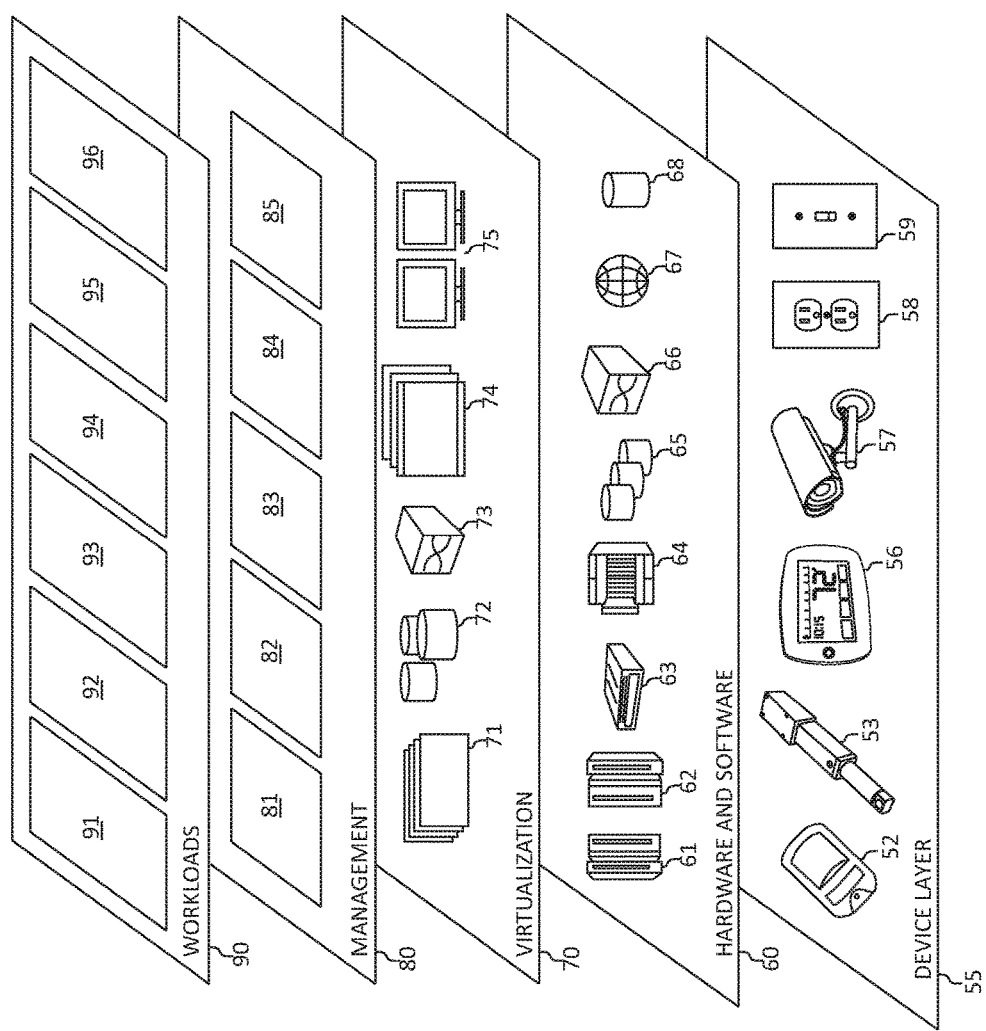
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices for fault detection in an end-to-end communication flow between microservices workloads and functions 96. In addition, configuring settings for various computer-controlled devices using workloads and functions 96 for fault detection in an end-to-end communication flow between microservices may include such operations as data analysis (including data collection and processing from various environmental sensors), semantic analysis, image analysis, control input analysis, device analysis, and/or data analytics functions. One of ordinary skill in the art will appreciate that the configuring settings for various computer-controlled devices using workloads and functions 96 for fault detection in an end-to-end communication flow between microservices in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
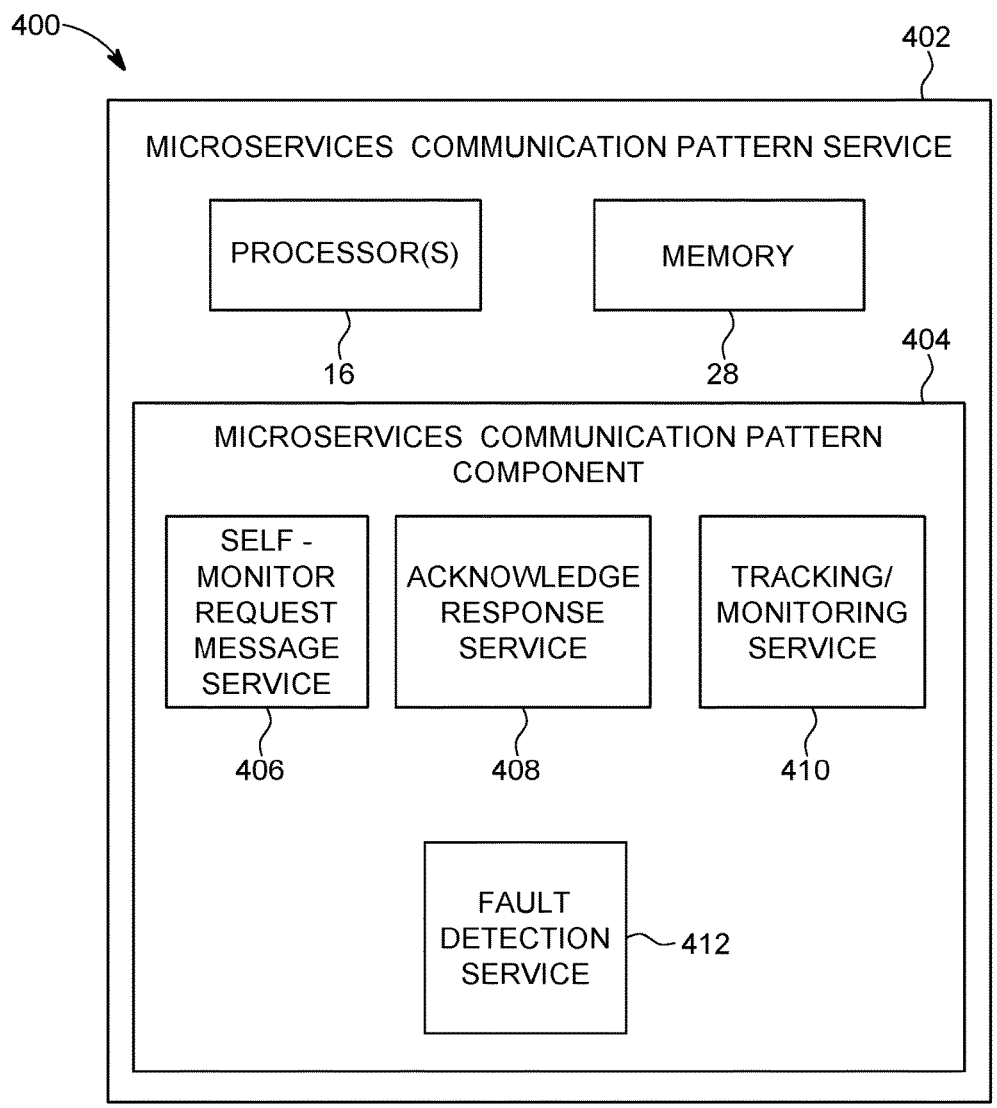
FIG. 4 is an additional block diagram depicting cognitive control system architecture according to an embodiment of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16, a system memory 28, and a bus 18 of FIG. 1 (not shown in FIG. 4 for illustrative purposes only) that couples various system components including system memory 28 to processor 16.

The computer system/server 12 of FIG. 1, may include a microservices communication pattern service 402 for fault detection in an end-to-end communication flow between microservices within a cloud computing environment, along with other related components.

The microservices communication pattern service 402 may include a microservices communication pattern component 404 and, again, processing units 16 and a system memory 28. In operation, the microservices communication pattern component 404 may establish a 3-way communication pattern between an invoking microservice (e.g., an application and/or a microservice) and one or more microservices to enable fault detection of a failure of an end-to-end communication flow between the invoking microservice and the one or more microservices. The self-monitor request message service 406 may send (from a microservice) and/or receive (by the invoking microservice) a request to self-monitor for the fault detection by the one or more microservices. Each end-to-end flow passing through the one or more microservices sending the request to self-monitor may be tracked and/or monitored by the tracking/monitoring service 410.

In the event the fault detection service 412 detects a failure of the end-to-end communication flow between the invoking microservice and the one or more microservices, the acknowledge response service 408 may send (from the perspective of the invoking microservice) an acknowledge response to each one of the one or more microservices sending the request to self-monitor. The acknowledge response indicates either a success or failure of the end-to-end communication flow between the invoking microservice and the one or more microservices. Alternatively, not receiving an acknowledgement, after a pre-determined wait time, signifies a failure as well that is detected by the one or more microservices.

It should be noted that a cloud computing application may be bound to multiple microservices. Some of these microservices may have the peer-to-peer monitoring capability. For example, when an application "X" invokes a microservice, the invoked service may subscribe to the current transaction with the requester application X. A unique transaction identifier (ID) may be used for subscribing. The unique transaction ID may be generated by application X and inserted in a header of the initial request. After application X completes the transaction processing, the application may publish a successful transaction notification to all subscribers (e.g., the subscribed microservices). In so doing, the present invention ensures that the application transaction does not end, fail, hang, or experience failure. For example, in the event of an application failure in the end-to-end flow, application X may call/invoke a number of microservices to execute and complete the full end-to-end flow. These microservices may reply with results and subscribe to the transaction monitoring notifications. After a selected time period has elapsed, if the subscribed microservice doesn't receive a callback/notification of transaction success from the main application, the application X may issue an alert. The alert can be directed to an administrator.

Also, in an alternate embodiment, a publication/subscription ("pub/sub") channel may be used for monitoring each transaction. The pub/sub channel may be uniquely identified by a transaction ID generated by the initiating application (e.g., application X as stated above). Each of the microservices involved in the end-to-end transaction may subscribe to receive notifications on that pub/sub channel. The success notifications may be sent by the application or invoking microservice on that pub/sub channel. Similarly, if a participating microservice, or the application itself, detects a transaction failure, the participating microservice or application may send a failure notification on that pub/sub channel. The alert may be received by all microservices participating in the transaction. Each microservice can react to that alert by executing a compensation action to rectify the situation, and reversing any actions that were taken in support of this incomplete transaction. For example, modified state records in a database (DB) or a key-value (KV) store may be undone. Such process may be more clearly illustrated in FIGS. 5-6, below.

Figure 5:
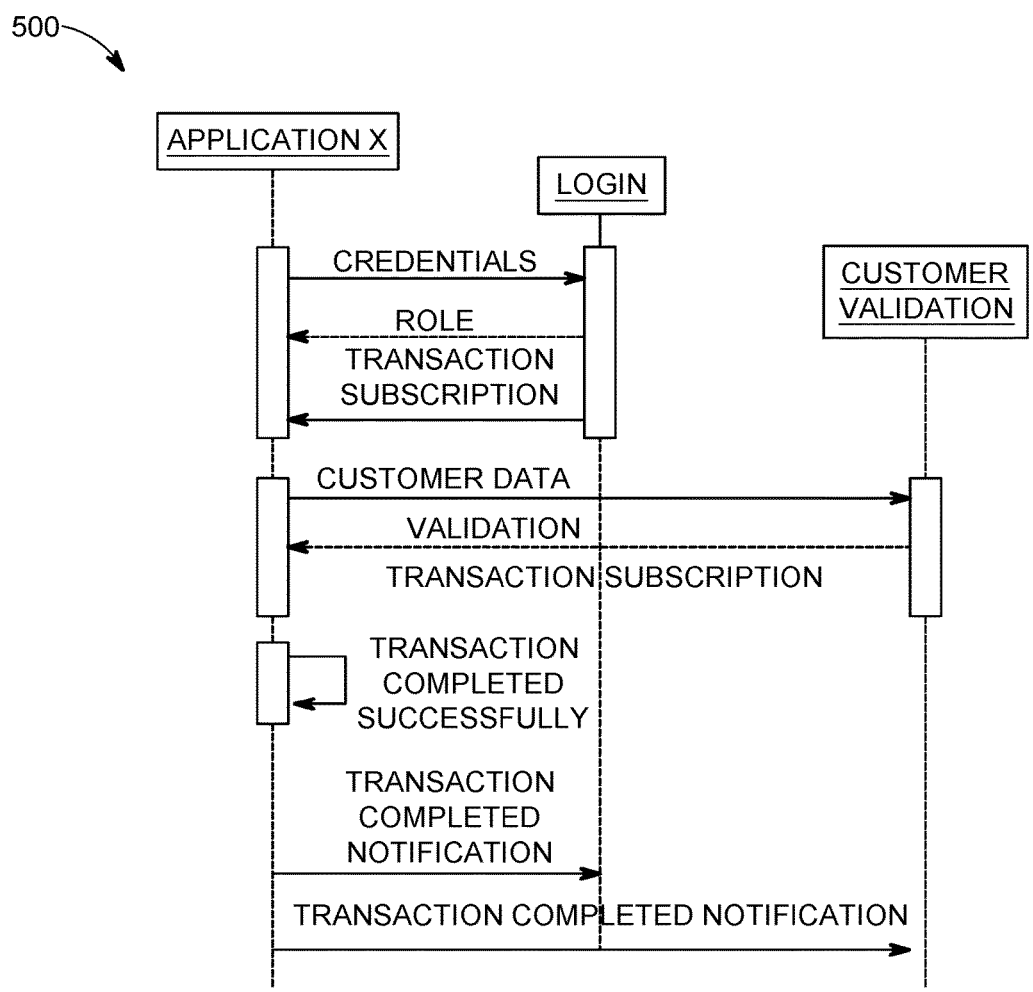
FIG. 5 is a flow diagram depicting fault detection in an end-to-end communication flow between microservices according to an embodiment of the present invention.

Turning now to FIG. 5, a block flow diagram (e.g., a sequence diagram) of exemplary functionality 500 for microservices communication pattern for fault detection in end-to-end application/communication flow messages in a cloud-computing environment according to various aspects of the present invention. As shown, the various functionality are depicted with arrows designating the functionality 500 relationships with each other and to show process flow. With the foregoing in mind, the functionality 500 may also be incorporated into various hardware and software components of a system for microservices communication pattern for fault detection in end-to-end application/communication flow messages in a cloud-computing environment in accordance with the present invention. In one aspect, one or more of the components, modules, services, applications, and/or functions described in FIGS. 1-4 may be used in FIG. 5.

The block flow diagram of exemplary functionality 500 illustrates an end-to-end application/communication flow message in a cloud-computing environment between application "X", a login microservice, and a customer validation microservice.

As illustrated, the application X (which may be a user application and/or microservice) sends to the login microservice a first communication message (e.g., "credentials"). The login microservice returns to the application X a return message (e.g., "role") that may also include a transaction subscription, which may be a header in the return message. The transaction subscription may indicate or "invoke" self-monitoring end-to-end application/communication flow failure at the login microservice.

The application X may send to the customer validation microservice a first communication message (e.g., "customer data"). The customer validation microservice may also return to the application X a return message (e.g., "validation") that may also include a transaction subscription, which may be a header in the return message. The transaction subscription may indicate or "invoke" self-monitoring end-to-end application/communication flow failure at the customer validation microservice.

Given there are no other additional microservices in the example of FIG. 5, the application X sends and receives a final message indicating each of the transactions relating to the login microservice and the customer validation microservice were successfully completed. As such, application X sends to both the login microservice and the customer validation microservice a $3^{rd}$ acknowledgement message, which may be a publication/subscription "PUB/SUB" message. The $3^{rd}$ acknowledgement message indicates to both the login microservice and the customer validation microservice a "transaction completed notification", which indicates no end-to-end application flow failure by one or more of the microservices participating in the end-to-end application/communication flow.

To further illustrate the mechanisms of the present invention, an invoker microservice (e.g., the client application) participating in a system may apply a 3-way communication pattern, which implies sending an acknowledgement message ("Ack" message) besides a request and response message to each microservice that is invoked by the invoker. The invoker may send these Ack messages at the end of the end-to-end application flow or after completing full execution of all its logic pertinent to the subject end-to-end flow. An end-to-end application/communication flow may represent a business process instance or a service instance. For example, from the perspective of an invoker, the invoker may send out the Ack messages to all microservices that may have invoked during a flow instance execution and/or after the full logic that the invoker needs to execute in order to complete successful processing of the flow instance.

Figure 6:
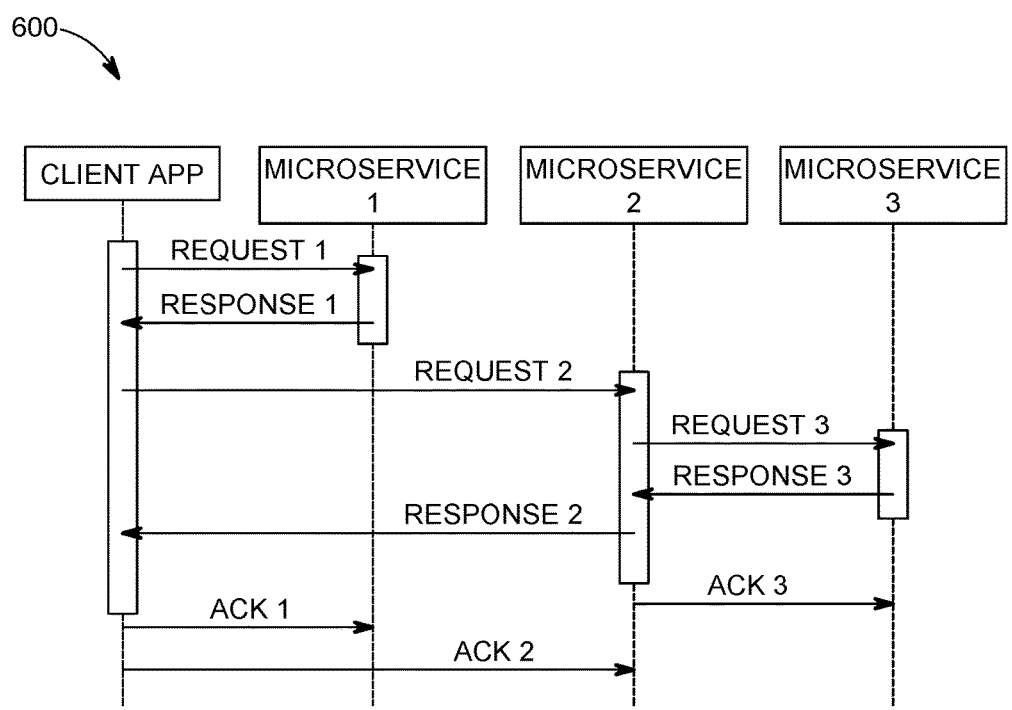
FIG. 6 is a flow diagram depicting fault detection in an end-to-end communication flow between microservices according to an embodiment of the present invention.

The invoker may track all invocations it made (within an end-to-end flow instance) so that the invoker can send the Ack messages to all invoked microservices at the end of completing its execution. In one aspect, the invoker may keep a list of invoked microservices and update the list whenever the invoker sends a request. This assumes all microservices will participate in the end-to-end monitoring and healthcheck protocol, which may be a default behavior. In an additional aspect, the invoked microservices may explicitly register to receive the Ack messages. For example, the registration process for each invoked microservice may be employed where some but not all of the microservices participate in the healthcheck protocol, which is more clearly illustrated in FIG. 6, below. In FIG. 6, the registrations are not shown explicitly as separate messages. The registrations may be carried in a response message header.

Turning now to FIG. 6, an additional block flow diagram (e.g., a sequence diagram) of exemplary functionality 600 relating to image processing is depicted, for microservices communication pattern for fault detection in end-to-end application/communication flow messages in a cloud-computing environment according to various aspects of the present invention. As shown, the various functionality are depicted with arrows designating the functionality 600 relationships with each other and to show process flow. With the foregoing in mind, the functionality 600 may also be incorporated into various hardware and software components of a system for microservices communication pattern for fault detection in end-to-end application/communication flow messages in a cloud-computing environment in accordance with the present invention. In one aspect, one or more of the components, modules, services, applications, and/or functions described in FIGS. 1-5 may be used in FIG. 6.

Turning specifically to the sequence of operation of FIG. 6, the sequence diagram of exemplary functionality 600 illustrates an end-to-end application/communication flow message in a cloud-computing environment between a client application "client app", microservice 1, microservice 2, and microservice 3. The end-to-end application/communication flow may be started in response to an external trigger received by the invoker microservice or client app (not shown for illustrative convenience). The external trigger may be a request message in the case of a microservice or a user input in the case of a client application.

The client application (which may be a user application and/or microservice) may send a first communication message ("request 1") to the microservice 1. The microservice 1 returns to the client application a response message ("response 1") that indicates or "invokes" self-monitoring end-to-end application/communication flow failure at the login microservice. The response messages of FIG. 6 enable each microservice to register with the client application to self-monitor for the fault detection at the microservice itself (e.g., microservice 1-3). By registering with the client application, the client application may monitor and track each one of the one or more microservices that sends the request to self-monitor in the response message and include the tracked microservices in a list.

The client application may then send a first communication message ("request 2") to the microservice 2. Microservice 2 may then send a communication message ("request 3") to the microservice 3, which may be prior to receiving a response message (e.g., "response 2") from microservice 2. Also, as indicated by way of example only, microservice 3 sends a response message ("response 3") that indicates or "invokes" self-monitoring end-to-end application/communication flow failure at the login microservice prior to microservice 2 sending a response message (e.g., "response 2") back to the client application.

Upon receiving response 3 from microservice 3, the microservice 2 returns to the client application a response message ("response 2") that indicates or "invokes" self-monitoring end-to-end application/communication flow failure at the login microservice.

Accordingly, microservice 2 sends a $3^{rd}$ acknowledgement message ("Ack 3") to microservice 3, indicates to microservice 3 a "transaction completed notification", which indicates no end-to-end application flow failure by microservice 2 participating in the end-to-end application/communication flow. The client application may send the $3^{rd}$ acknowledgement message ("Ack 1") to microservice 1. The client application may also send the $3^{rd}$ acknowledgement message ("Ack 2") to microservice 2.

Figure 7:
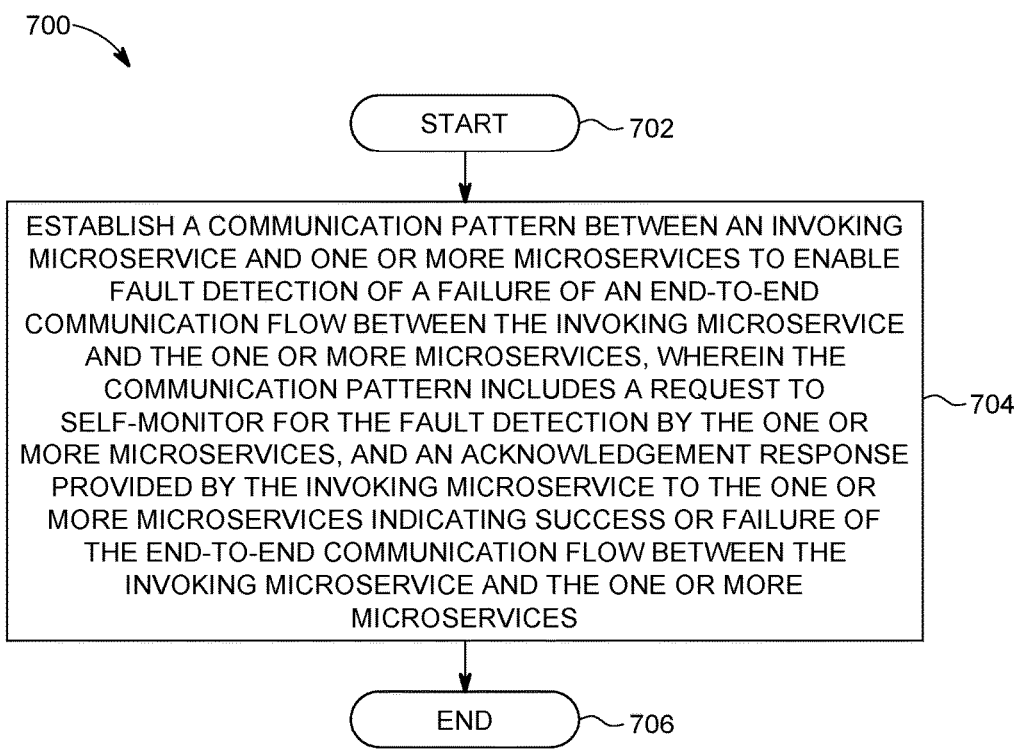
FIG. 7 is a flowchart diagram depicting an exemplary method for fault detection in an end-to-end communication flow between microservices by a processor; again, in which aspects of the present invention may be realized.

Turning now to FIG. 7, a method 700 for fault detection in an end-to-end communication flow between microservices within a cloud computing environment, by a processor, is depicted. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine readable storage medium. The functionality 700 may start in block 702. A communication pattern may be established between an invoking microservice and one or more microservices to enable fault detection of a failure of an end-to-end communication flow between the invoking microservice and the one or more microservices, wherein the communication pattern includes a request to self-monitor for the fault detection by the one or more microservices, and an acknowledgement response provided by the invoking microservice to the one or more microservices indicating success or failure of the end-to-end communication flow between the invoking microservice and the one or more microservices, as in block 704. The functionality 700 may end, as in block 706.

In one aspect, in conjunction with and/or as part of at least one block of FIG. 7, the operations of method 700 may include each of the following. The operations of method 700 may include sending to the invoking microservice the request to self-monitor for the fault detection by the one or more microservices upon receiving from the invoking microservice a first communication message, wherein the invoking microservice is an application or a microservice. The operations of method 700 may send the acknowledgement response indicating a failure of the end-to-end communication flow between the invoking microservice and the one or more microservices upon at least one of the one or more microservices detecting a failure of an end-to-end communication flow occurring at the at least one of the one or more microservices.

Each one of the one or more microservices that send the request to self-monitor for the fault detection may be registered with the invoking microservice. Each one of the one or more microservices that send the request to self-monitor may also be monitored and/or tracked. A list of the tracked microservices may be created and maintained.

The operations of method 700 may also send the acknowledgement response indicating success or failure of the end-to-end communication flow failure between the invoking microservice and the one or more microservices only to those of the one or more microservices sending the request.

Also, the end-to-end communication flow may start/commence with the invoking microservice receiving an external trigger. The external trigger may include at least a request message or a user input. Also, the communication pattern may be a 3-way communication pattern between the invoking microservice and those of the one or more microservices sending the request.

Also, the operations of method 700 may send to the invoking microservice the request to self-monitor for the fault detection by the one or more microservices upon receiving from the invoking microservice a first communication message, wherein the invoking microservice is an application or a microservice and whereas the request to self-monitor is associated with a header of the response message sent back from each of the one or more microservices to the invoking microservice. The operations of method 700 may send the acknowledgement response indicating failure or success of the end-to-end communication flow between the invoking microservice and the one or more microservices upon the invoking microservice encountering a failure in the end-to-end flow or determining that the end-to-end flow has completed successfully, receive the acknowledgement response, from the invoking microservice, indicating the failure, detecting the failure, and triggering a notification or corrective action, receive the acknowledgement response, from the invoking microservice, indicating completion of the end-to-end flow with success, detecting the absence of the failure, or triggering the notification or the corrective action, and/or a failure and trigger a notification or corrective action upon failing to receive a receipt of the acknowledgement response, from the invoking microservice after a pre-determined timeout period.

Figure 8:
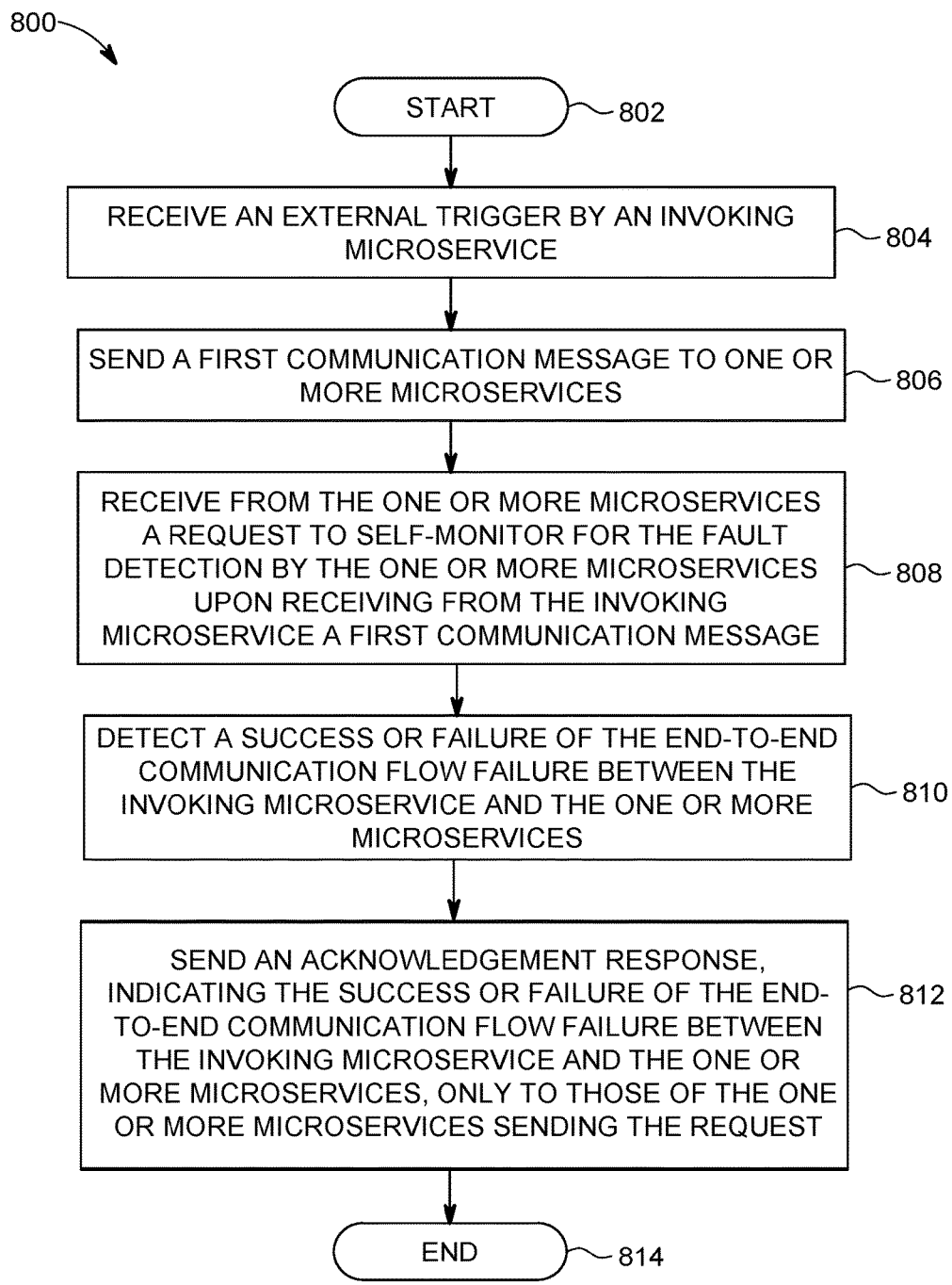
FIG. 8 is an additional flowchart diagram depicting an exemplary method for fault detection in an end-to-end communication flow between microservices by a processor; again, in which aspects of the present invention may be realized.

Turning now to FIG. 8, a method 800 for fault detection in an end-to-end communication flow between microservices within a cloud computing environment, by a processor, is depicted. In one aspect, each of the devices, components, modules, operations, and/or functions described in FIGS. 1-6 also may apply or perform one or more operations or actions of FIG. 8. The functionality 800 may be implemented as a method executed as instructions on a machine, where the instructions are included on at least one computer readable medium or one non-transitory machine readable storage medium. The functionality 800 may start in block 802. An external trigger may be received by an invoking microservice, as in block 804. A first communication message may be sent to one or more microservices, as in block 806. A request (e.g., a second communication message) to self-monitor for the fault detection may be received from the one or more microservices upon receiving from the invoking microservice the first communication message, as in block 808. A success or failure of the end-to-end communication flow failure between the invoking microservice and the one or more microservices may be detected, as in block 810. An acknowledgement response (e.g., a third communication message), indicating the success or failure of the end-to-end communication flow failure between the invoking microservice and the one or more microservices, may be sent only to those of the one or more microservices sending the request to self-monitor, as in block 812. The functionality 800 may end, as in block 814.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for fault detection in an end-to-end communication flow between microservices within a cloud computing environment, by a processor device, comprising:
   establishing a communication pattern between an invoking microservice and one or more microservices to enable fault detection of a failure of an end-to-end communication flow between the invoking microservice and the one or more microservices, wherein the communication pattern includes a request to self-monitor for the fault detection by the one or more microservices, and an acknowledgement response provided by the invoking microservice to the one or more microservices indicating success or failure of the end-to-end communication flow between the invoking microservice and the one or more microservices; and
   sending the acknowledgement response indicating failure or success of the end-to-end communication flow between the invoking microservice and the one or more microservices upon the invoking micro service encountering a failure in the end-to-end flow or determining that the end-to-end flow has completed successfully;
   receiving the acknowledgement response, from the invoking microservice, indicating the failure, detecting the failure, and triggering a notification or corrective action;
   receiving the acknowledgement response, from the invoking microservice, indicating completion of the end-to-end flow with success, detecting an absence of the failure, or triggering the notification or the corrective action; or
   detecting a failure and trigger a notification or corrective action upon failing to receive a receipt of the acknowledgement response, from the invoking microservice after a pre-determined timeout period.

2. The method of claim 1, further including sending to the invoking microservice the request to self-monitor for the fault detection by the one or more microservices upon receiving from the invoking microservice a first communication message, wherein the invoking microservice is an application or a microservice and whereas the request to self-monitor is associated with a header of the response message sent back from each of the one or more microservices to the invoking microservice.

3. The method of claim 1, further including registering each one of the one or more microservices that send the request to self-monitor for the fault detection with the invoking microservice.

4. The method of claim 1, further including tracking each one of the one or more microservices that send the request to self-monitor, wherein a list is maintained of each of the one or more microservices that are tracked.

5. The method of claim 1, further including sending the acknowledgement response indicating success or failure of the end-to-end communication flow between the invoking microservice and the one or more microservices only to those of the one or more microservices sending the request.

6. The method of claim 1, further including starting the end-to-end communication flow with the invoking microservice receiving an external trigger, wherein the external trigger includes at least a request message or a user input, wherein the communication pattern is a 3-way communication pattern between the invoking microservice and those of the one or more microservices participating in a processing of the end-to-end flow.

7. A system for fault detection in an end-to-end communication flow between microservices within a cloud computing environment, comprising:
   one or more computers with executable instructions that when executed cause the system to:
   establish a communication pattern between an invoking microservice and one or more microservices to enable fault detection of a failure of an end-to-end communication flow between the invoking microservice and the one or more microservices, wherein the communication pattern includes a request to self-monitor for the fault detection by the one or more microservices, and an acknowledgement response provided by the invoking microservice to the one or more microservices indicating success or failure of the end-to-end communication flow between the invoking microservice and the one or more microservices; and
   send the acknowledgement response indicating failure or success of the end-to-end communication flow between the invoking microservice and the one or more microservices upon the invoking micro service encountering a failure in the end-to-end flow or determining that the end-to-end flow has completed successfully;
   receive the acknowledgement response, from the invoking microservice, indicating the failure, detecting the failure, and triggering a notification or corrective action;
   receive the acknowledgement response, from the invoking microservice, indicating completion of the end-to-end flow with success, detecting an absence of the failure, or triggering the notification or the corrective action; or
   detect a failure and trigger a notification or corrective action upon failing to receive a receipt of the acknowledgement response, from the invoking microservice after a pre-determined timeout period.

8. The system of claim 7, wherein the executable instructions further send to the invoking microservice the request to self-monitor for the fault detection by the one or more microservices upon receiving from the invoking microservice a first communication message, wherein the invoking microservice is an application or a microservice and whereas the request to self-monitor is associated with a header of the response message sent back from each of the one or more microservices to the invoking microservice.

9. The system of claim 7, wherein the executable instructions further register each one of the one or more microservices that send the request to self-monitor for the fault detection with the invoking microservice.

10. The system of claim 7, wherein the executable instructions further track each one of the one or more microservices that send the request to self-monitor, wherein a list is maintained of each of the one or more microservices that are tracked.

11. The system of claim 7, wherein the executable instructions further send the acknowledgement response indicating success or failure of the end-to-end communication flow between the invoking microservice and the one or more microservices only to those of the one or more microservices sending the request.

12. The system of claim 7, wherein the executable instructions further start the end-to-end communication flow with the invoking microservice receiving an external trigger, wherein the external trigger includes at least a request message or a user input, wherein the communication pattern is a 3-way communication pattern between the invoking microservice and those of the one or more microservices sending the request participating in a processing of the end-to-end flow.

13. A computer program product for, by a processor, fault detection in an end-to-end communication flow between microservices within a cloud computing environment, the computer program product comprising a non-transitory computer-readable storage medium having computer-readable program code portions stored therein, the computer-readable program code portions executed by the processor, comprising:
   an executable portion that establishes a communication pattern between an invoking microservice and one or more microservices to enable fault detection of a failure of an end-to-end communication flow between the invoking microservice and the one or more microservices, wherein the communication pattern includes a request to self-monitor for the fault detection by the one or more microservices, and an acknowledgement response provided by the invoking microservice to the one or more microservices indicating success or failure of the end-to-end communication flow between the invoking microservice and the one or more microservices; and
   an executable portion that:
      sends the acknowledgement response indicating failure or success of the end-to-end communication flow between the invoking microservice and the one or more microservices upon the invoking micro service encountering a failure in the end-to-end flow or determining that the end-to-end flow has completed successfully;
      receives the acknowledgement response, from the invoking microservice, indicating the failure, detecting the failure, and triggering a notification or corrective action;
      receives the acknowledgement response, from the invoking microservice, indicating completion of the end-to-end flow with success, detecting an absence of the failure, or triggering the notification or the corrective action; or
      detects a failure and trigger a notification or corrective action upon failing to receive a receipt of the acknowledgement response, from the invoking microservice after a pre-determined timeout period.

14. The computer program product of claim 13, further including an executable portion that sends to the invoking microservice the request to self-monitor for the fault detection by the one or more microservices upon receiving from the invoking microservice a first communication message, wherein the invoking microservice is an application or a microservice and whereas the request to self-monitor is associated with a header of the response message sent back from each of the one or more microservices to the invoking microservice.

15. The computer program product of claim 13, further including an executable portion that registers each one of the one or more microservices that send the request to self-monitor for the fault detection with the invoking microservice.

16. The computer program product of claim 13, further including an executable portion that tracks each one of the one or more microservices that send the request to self-monitor, wherein a list is maintained of each of the one or more microservices that are tracked.

17. The computer program product of claim 13, further including an executable portion that sends the acknowledgement response indicating success or failure of the end-to-end communication flow between the invoking microservice and the one or more microservices only to those of the one or more microservices sending the request.

18. The computer program product of claim 13, further including an executable portion that starts the end-to-end communication flow with the invoking microservice receiving an external trigger, wherein the external trigger includes at least a request message or a user input, wherein the communication pattern is a 3-way communication pattern between the invoking microservice and those of the one or more microservices sending the request participating in a processing of the end-to-end flow.

* * * * *